(12) United States Patent
Hou et al.

(10) Patent No.: US 9,869,139 B2
(45) Date of Patent: Jan. 16, 2018

(54) TUBULAR CONNECTION WITH HELICALLY EXTENDING TORQUE SHOULDER

(71) Applicant: ULTRA PREMIUM OILFIELD SERVICES, LTD., Houston, TX (US)

(72) Inventors: Fu J Hou, Missouri City, TX (US); Edward O Banker, Houston, TX (US)

(73) Assignee: ULTRA PREMIUM OILFIELD SERVICES, LTD., Houston, TX (US)

( * ) Notice: Subject to any disclaimer, the term of this patent is extended or adjusted under 35 U.S.C. 154(b) by 836 days.

(21) Appl. No.: 13/798,330

(22) Filed: Mar. 13, 2013

(65) Prior Publication Data

US 2014/0145433 A1 May 29, 2014

Related U.S. Application Data

(60) Provisional application No. 61/730,720, filed on Nov. 28, 2012.

(51) Int. Cl.
*F16L 15/00* (2006.01)
*E21B 17/042* (2006.01)

(52) U.S. Cl.
CPC ......... *E21B 17/0423* (2013.01); *F16L 15/002* (2013.01)

(58) Field of Classification Search
USPC .................................. 285/333–334, 355, 390
See application file for complete search history.

(56) References Cited

U.S. PATENT DOCUMENTS

| 1,019,707 A | * | 3/1912 | Wilcox ................... E21B 10/02 |
| | | | 175/403 |
| 1,927,656 A | | 9/1933 | Eaton et al. |
| 2,006,520 A | | 7/1935 | Stone et al. |

(Continued)

FOREIGN PATENT DOCUMENTS

| DE | 2438387 | 2/1976 |
| FR | 1130913 | 2/1957 |

(Continued)

OTHER PUBLICATIONS

International Search Report; dated Apr. 21, 2014; PCT US2013/071652; filed Nov. 25, 2013; 2 pgs.

(Continued)

*Primary Examiner* — Aaron Dunwoody
*Assistant Examiner* — Fannie Kee
(74) *Attorney, Agent, or Firm* — Morgan, Lewis & Bockius LLP

(57) ABSTRACT

A tubular connection includes a pin member and a box member. The pin member has a first thread structure and a helical torque shoulder spaced axially along the pin member from the first thread structure. The box member has a second thread structure and a second helical torque shoulder spaced axially along the box member from the second thread structure. The first thread structure and the second thread structure are sized and located to control a stab position of the tubular connection, and in the stab position the first helical torque shoulder does not engage or axially overlap with the second helical torque shoulder. A method of joining tubular members utilizing a helical torque shoulder is also provided.

18 Claims, 9 Drawing Sheets

(56) References Cited

U.S. PATENT DOCUMENTS

| | | | |
|---|---|---|---|
| 2,204,754 A | 6/1940 | Frame | |
| 2,211,179 A | 8/1940 | Stone | |
| 2,259,232 A | 10/1941 | Stone | |
| 2,273,017 A * | 2/1942 | Boynton | E21B 17/0423 285/288.5 |
| 2,772,102 A | 11/1956 | Webb | |
| 2,893,759 A | 7/1959 | Blose | |
| 2,907,589 A | 10/1959 | Knox | |
| 3,224,799 A | 12/1965 | Blose et al. | |
| 3,359,013 A | 12/1967 | Knox et al. | |
| 3,856,337 A | 12/1974 | Ehm et al. | |
| 3,870,351 A | 3/1975 | Matsuki | |
| 3,895,829 A * | 7/1975 | Manson, Jr. | E21B 17/043 285/3 |
| 3,989,284 A | 11/1976 | Blose | |
| 4,009,893 A | 3/1977 | Schatton et al. | |
| 4,121,862 A | 10/1978 | Greer | |
| 4,161,332 A | 7/1979 | Blose | |
| 4,244,607 A | 1/1981 | Blose | |
| 4,330,142 A | 5/1982 | Paini | |
| 4,384,737 A | 5/1983 | Reusser | |
| 4,398,756 A | 8/1983 | Duret et al. | |
| 4,444,421 A | 4/1984 | Ahlstone | |
| 4,494,777 A | 1/1985 | Duret | |
| 4,508,375 A | 4/1985 | Patterson et al. | |
| 4,538,840 A | 9/1985 | DeLange | |
| 4,570,892 A | 5/1986 | Czech et al. | |
| 4,600,224 A | 7/1986 | Blose | |
| 4,603,889 A | 8/1986 | Welsh | |
| 4,611,838 A | 9/1986 | Heilmann et al. | |
| 4,629,221 A | 12/1986 | Lumsden et al. | |
| 4,629,224 A | 12/1986 | Landriault | |
| 4,662,659 A | 5/1987 | Blose et al. | |
| 4,688,832 A | 8/1987 | Ortloff et al. | |
| 4,707,001 A | 11/1987 | Johnson | |
| 4,712,815 A | 12/1987 | Reeves | |
| 4,728,129 A | 3/1988 | Morris | |
| 4,730,857 A | 3/1988 | Schwind | |
| 4,753,460 A | 6/1988 | Tung | |
| 4,822,081 A | 4/1989 | Blose | |
| 4,915,426 A | 4/1990 | Skipper | |
| 4,917,409 A | 4/1990 | Reeves | |
| 4,928,999 A | 5/1990 | Landriault et al. | |
| 4,944,538 A | 7/1990 | Read | |
| 4,958,862 A | 9/1990 | Cappelli et al. | |
| 4,962,579 A | 10/1990 | Moyer et al. | |
| 5,066,052 A | 11/1991 | Read | |
| 5,092,635 A | 3/1992 | DeLange et al. | |
| 5,154,452 A | 10/1992 | Johnson | |
| 5,236,230 A | 8/1993 | Mudge, Jr. et al. | |
| 5,330,239 A | 7/1994 | Blose et al. | |
| 5,338,074 A | 8/1994 | Barringr et al. | |
| 5,348,350 A | 9/1994 | Blose et al. | |
| 5,360,240 A | 11/1994 | Mott | |
| 5,415,442 A | 5/1995 | Klementich | |
| 5,427,418 A | 6/1995 | Watts | |
| 5,454,605 A | 10/1995 | Mott | |
| 5,462,315 A | 10/1995 | Klementich | |
| 5,468,029 A | 11/1995 | Blose et al. | |
| 5,492,375 A | 2/1996 | Smith | |
| 5,498,035 A | 3/1996 | Blose et al. | |
| 5,516,158 A | 5/1996 | Watts | |
| 5,549,336 A | 8/1996 | Hori et al. | |
| 5,709,416 A | 1/1998 | Wood | |
| 5,765,836 A | 6/1998 | Banker et al. | |
| 5,826,921 A | 10/1998 | Woolley | |
| 5,829,797 A | 11/1998 | Yamamoto et al. | |
| 6,010,163 A | 1/2000 | Cerruti | |
| 6,024,646 A | 2/2000 | Reed et al. | |
| 6,041,487 A | 3/2000 | Banker et al. | |
| 6,045,165 A | 4/2000 | Sugino et al. | |
| 6,158,785 A | 12/2000 | Beaulier et al. | |
| 6,174,001 B1 | 1/2001 | Enderle | |
| 6,206,436 B1 * | 3/2001 | Mallis | E21B 17/042 285/334 |
| 6,237,967 B1 | 5/2001 | Yamamoto et al. | |
| 6,254,146 B1 | 7/2001 | Church | |
| 6,270,127 B1 | 8/2001 | Enderle | |
| 6,322,110 B1 | 11/2001 | Banker et al. | |
| 6,412,831 B1 | 7/2002 | Noel et al. | |
| 6,478,344 B2 | 11/2002 | Pallini, Jr. et al. | |
| 6,550,821 B2 | 4/2003 | DeLange et al. | |
| 6,578,880 B2 | 6/2003 | Watts | |
| 6,581,980 B1 | 6/2003 | DeLange et al. | |
| 6,619,696 B2 | 9/2003 | Baugh et al. | |
| 6,622,797 B2 | 9/2003 | Sivley, IV | |
| 6,626,471 B2 | 9/2003 | Mallis | |
| 6,722,706 B2 | 4/2004 | Church | |
| 6,764,108 B2 | 7/2004 | Ernst et al. | |
| 6,832,789 B2 | 12/2004 | Church | |
| 6,848,724 B2 | 2/2005 | Kessler | |
| 6,877,202 B2 | 4/2005 | Maeda | |
| 6,905,149 B2 | 6/2005 | DeLange et al. | |
| 7,156,676 B2 | 1/2007 | Reynolds, Jr. | |
| 7,243,957 B2 | 7/2007 | Reynolds, Jr. | |
| 7,331,614 B2 | 2/2008 | Noel et al. | |
| 7,334,821 B2 | 2/2008 | Dutilleul et al. | |
| 7,350,830 B1 | 4/2008 | DeLange et al. | |
| 7,380,840 B2 | 6/2008 | Sivley, IV | |
| 7,431,347 B2 | 10/2008 | Ernst et al. | |
| 7,438,329 B2 | 10/2008 | DeLange et al. | |
| 7,458,616 B2 | 12/2008 | Reynolds, Jr. | |
| 7,464,612 B2 | 12/2008 | Manella et al. | |
| 7,475,917 B2 | 1/2009 | Sivley, IV et al. | |
| 7,494,159 B2 | 2/2009 | Sugino et al. | |
| 7,500,698 B2 | 3/2009 | Reynolds, Jr. | |
| 7,527,304 B2 * | 5/2009 | Mallis | E21B 17/0423 285/333 |
| 7,562,911 B2 | 7/2009 | Reynolds, Jr. et al. | |
| 7,575,255 B2 | 8/2009 | Reynolds, Jr. et al. | |
| 7,578,039 B2 | 8/2009 | Reynolds, Jr. et al. | |
| 7,588,269 B2 | 9/2009 | Church | |
| 7,607,333 B2 | 10/2009 | Sivley, IV et al. | |
| 7,686,350 B2 | 3/2010 | Reynolds, Jr. et al. | |
| 7,690,696 B2 | 4/2010 | Mallis et al. | |
| 7,690,697 B2 | 4/2010 | Church | |
| 7,717,478 B2 | 5/2010 | Reynolds, Jr. | |
| 7,780,202 B2 | 8/2010 | Breihan et al. | |
| 7,784,551 B2 | 8/2010 | Angman et al. | |
| 7,810,849 B2 | 10/2010 | Reynolds, Jr. | |
| 7,828,337 B2 | 11/2010 | Reynolds, Jr. | |
| 7,837,210 B2 | 11/2010 | Kylstra et al. | |
| 7,850,211 B2 | 12/2010 | Reynolds, Jr. et al. | |
| 7,942,454 B2 | 5/2011 | Reynolds, Jr. | |
| 7,988,205 B2 | 8/2011 | Mallis et al. | |
| 8,079,623 B2 | 12/2011 | Pallini, Jr. et al. | |
| 8,562,771 B2 | 10/2013 | Ribalta et al. | |
| 8,668,233 B2 | 3/2014 | Mallis et al. | |
| 8,714,243 B2 | 5/2014 | DeLange et al. | |

FOREIGN PATENT DOCUMENTS

| | | |
|---|---|---|
| GB | 1173471 | 12/1969 |
| GB | 2161563 | 1/1986 |
| PL | 215749 | 12/2009 |
| SU | 500468 | 1/1976 |
| WO | WO 1984/004352 | 11/1984 |
| WO | 9215815 | 9/1992 |
| WO | WO 2002/056778 | 7/2002 |
| WO | WO 2007/114460 | 10/2007 |

OTHER PUBLICATIONS

Written Opinion; dated Apr. 21, 2014; PCT US2013/071652; filed Nov. 25, 2013; 7 pgs.

Poland Patent Office; Appn. No. P.412632, Office Action dated Jan. 20, 2016 and English Translation.

* cited by examiner

TUBULAR CONNECTION WITH HELICALLY EXTENDING TORQUE SHOULDER

CROSS-REFERENCES

This application claims the benefit of U.S. Provisional Application Ser. No. 61/730,720, filed Nov. 28, 2012, the entirety of which is incorporated herein by reference.

TECHNICAL FIELD

The present application is directed to tubular connections and, more particularly, to a tubular connection having a helical torque shoulder arrangement.

BACKGROUND

The Oil & Gas upstream production industry drills wells of ever increasing depth and complexity to find and produce raw hydrocarbons. The industry routinely uses steel pipe (Oil Country Tubular Goods) to protect the borehole (casing) and to control the fluids produced therein (tubing). Casing and tubing are made and transported in relatively short lengths and installed in the borehole one length at a time, each length being connected to the next. As the search for oil and gas has driven companies to drill deeper and more difficult wells, the demands on the casing and tubing have grown proportionately greater in terms of both tensile and pressure forces. The developing technology of deviated and horizontal wells have exacerbated this trend, adding to the casing and tubing requirements a further consideration of increasing torsional loads.

Two general classes of connectors exist within this field. The most common is the threaded and coupled connector, wherein two pin, or male threads, which are machined on the ends of two long joints of pipe, are joined by two box, or female threads, machined on a relatively short member, a coupling, with a larger outside diameter than the pipe, and approximately the same inside diameter. The other class is the integral connector, wherein the pin member is threaded onto one end of a full-length joint of pipe and the box member is threaded into the second full-length joint. The two joints can then be directly joined without the need for an intermediate coupling member. The ends of the pipe body may be processed further to facilitate the threading of the connection.

A thread profile is generally defined by a thread root, a thread crest, a stab flank, and a load flank as generally shown in FIG. 1. In a conventional thread, the "included angle", the angle between the load and stab flanks is positive, meaning that the width of the thread crest is less than the width of the thread groove with which it is initially engaged. Hence, the pin tooth is easily positioned into the box groove as the threads are assembled by rotating one member into the other. In the final assembly position, either or both of the crests and roots may be engaged, and clearance may exist between the load flanks or the stab flanks. This allows the thread to be easily assembled. As reflected in the exemplary thread position shown in FIG. 2A (stab position), 2B (engaged position) and 2C (fully made-up position), this clearance avoids the case of the load and stab flanks developing positive interference with its mating surface, which would cause the thread to "lock" and not fully engage.

A number of advancements over the years have given rise to "premium" connections. One can generally characterize these connections, compared to the connections specified by API (American Petroleum Institute) and other like organizations, in that they feature: 1), more sophisticated thread profiles; 2), one or more metal-to-metal sealing surfaces; and 3), one or more torque shoulders. The torque shoulder(s) are a mechanism used to geometrically position the metal seal(s) and to react against the threads to resist externally applied torque, while maintaining relatively low circumferential stress within the threaded section(s) of the connection. The torque resistance is a function of the torque shoulder area.

Another type of thread system that has been used in this field is known as a "wedge" thread, which is formed by a system of dovetail threads of varying width or varying pitch. This type of thread arrangement allows threads to easily be engaged and assembled, and yet to develop positive interference between opposing flanks of the thread in the fully assembled position. The wedge thread generally has a greater torque resistance that other premium threaded connections. The "wedge thread" has certain disadvantages, the principal one being that it is far more difficult to manufacture and measure than a thread with only a single pitch. Manufacturing a wedge thread on a taper further increases the difficulty of both the threading process and the measurement process.

What is needed by the drillers and producers of deep, high-pressure, hot, and/or deviated oil and gas wells is a threaded connection that has high-torque characteristics with relative ease of machining and production cost.

SUMMARY

In one aspect, a method of joining tubular length of oil country tubular casing or piping involves the steps of: utilizing a first tubular member having an associated pin member with a first thread structure and a first helical torque shoulder spaced axially along the pin member from the first thread structure; utilizing a second tubular member having an associated box member with a second thread structure and a second helical torque shoulder spaced axially along the box member from the second thread structure; engaging the pin member and box member with each other into a stab position that is defined by interaction of the first thread structure and the second thread structure, in the stab position the first helical torque shoulder does not contact or axially overlap with the second helical torque shoulder; rotating at least one of the first tubular member or the second tubular member such that interaction between the first thread structure and the second thread structure guides the first helical torque shoulder into cooperating alignment with the second helical torque shoulder; and continuing rotation of at least one of the first tubular member or the second tubular member until the first helical torque shoulder fully engages with the second helical torque shoulder.

In another aspect, a tubular connection includes a pin member and a box member. The pin member has a first thread structure and a helical torque shoulder spaced axially along the pin member from the first thread structure. The box member has a second thread structure and a second helical torque shoulder spaced axially along the box member from the second thread structure. The first thread structure and the second thread structure are sized and located to control a stab position of the tubular connection, and in the stab position the first helical torque shoulder does not engage or axially overlap with the second helical torque shoulder.

In one example, the first thread structure and the second thread structure may be respective tapered constant pitch threads and the first and second helical torque shoulder may be formed by respective non-tapered structures.

The details of one or more embodiments are set forth in the accompanying drawings and the description below. Other features, objects, and advantages will be apparent from the description and drawings, and from the claims.

DETAILED DESCRIPTION

The current tubular connection provides a helical torque shoulder arrangement.

In the primary embodiment, the conventional circumferentially extending torque shoulder (e.g., the shoulder normally found at the pin-nose to box-base of a threaded and coupled premium connection, or a center shoulder) is supplemented or supplanted by a helically extending torque shoulder.

Figure 1:
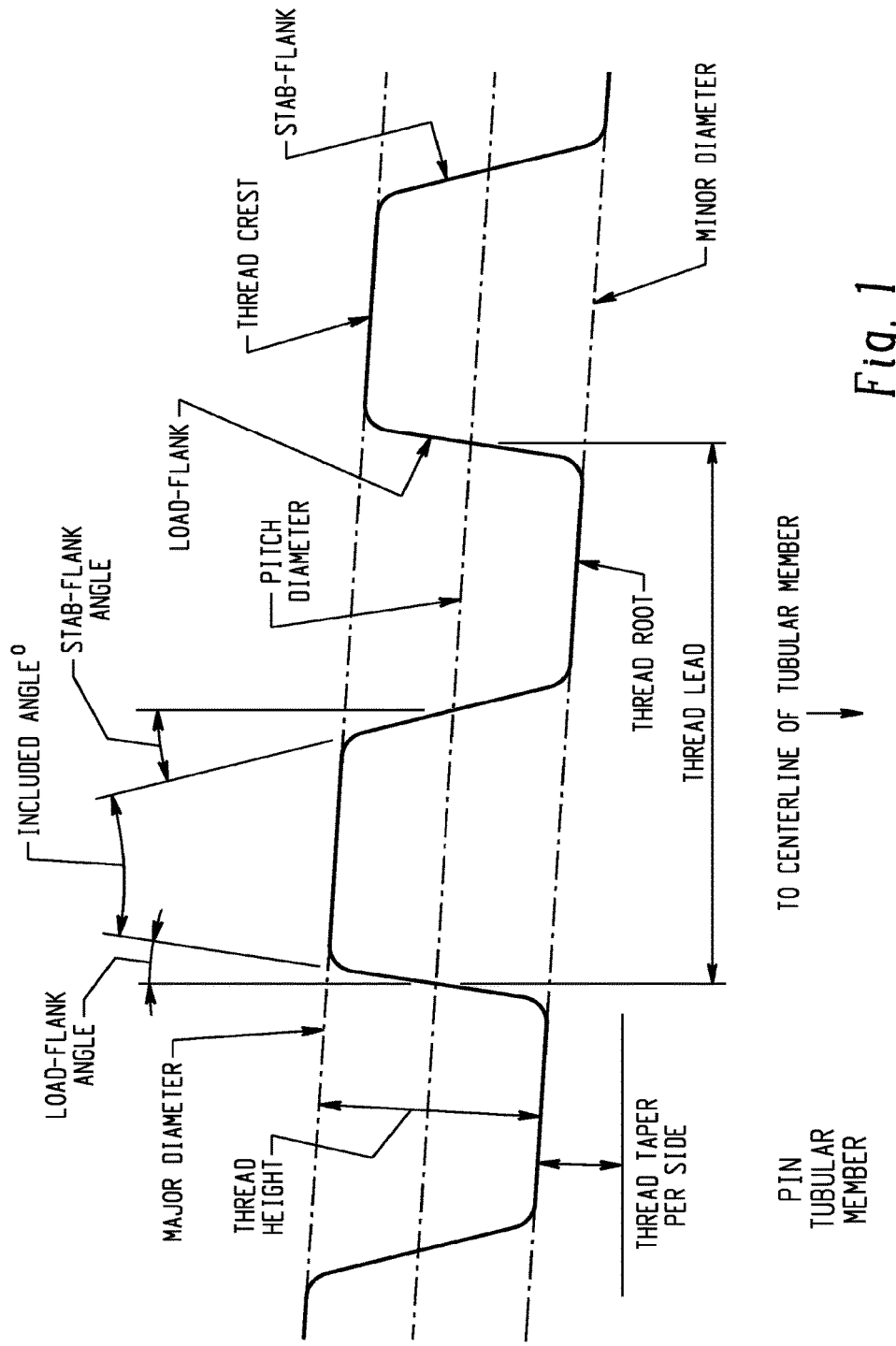
FIG. 1 is a schematic profile of a thread form.
Figure 2A:
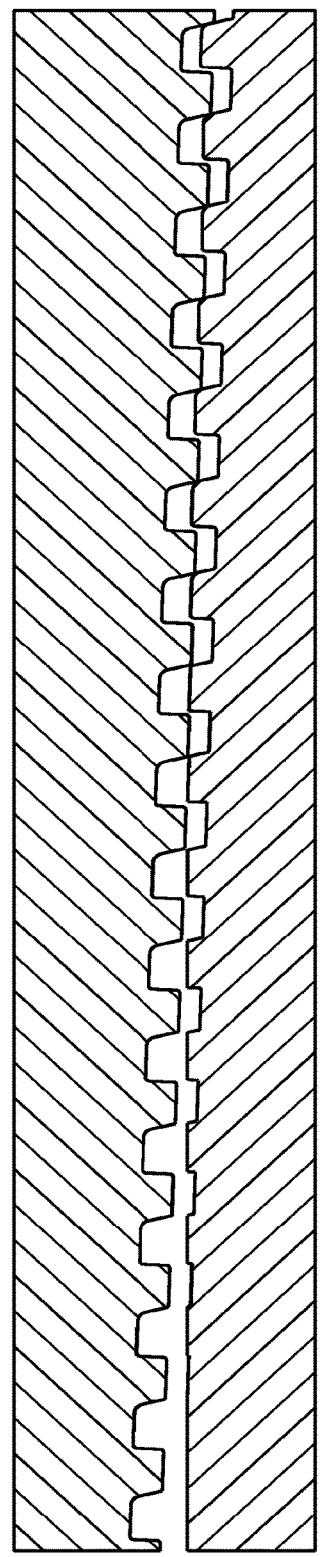
FIGS. 2A, 2B and 2C show a portion of a connection in stab, engaged and make-up conditions respectively.
Figure 2B:
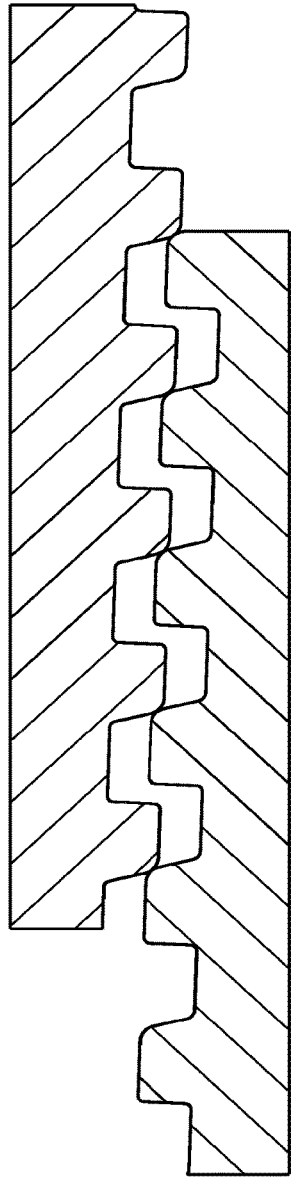
Figure 2C:
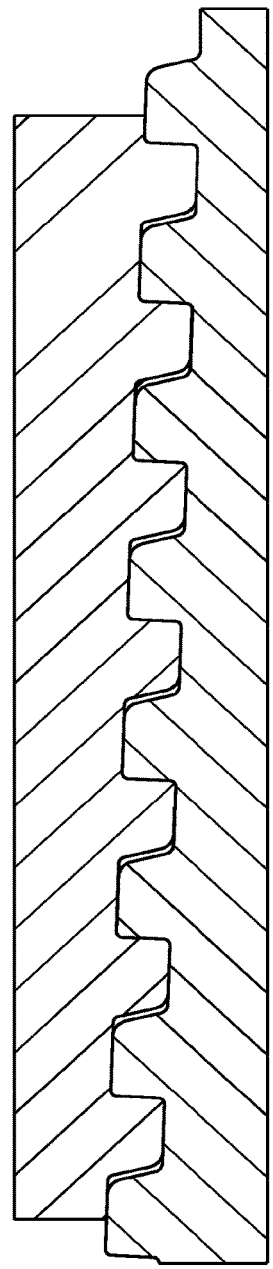
Figure 3:
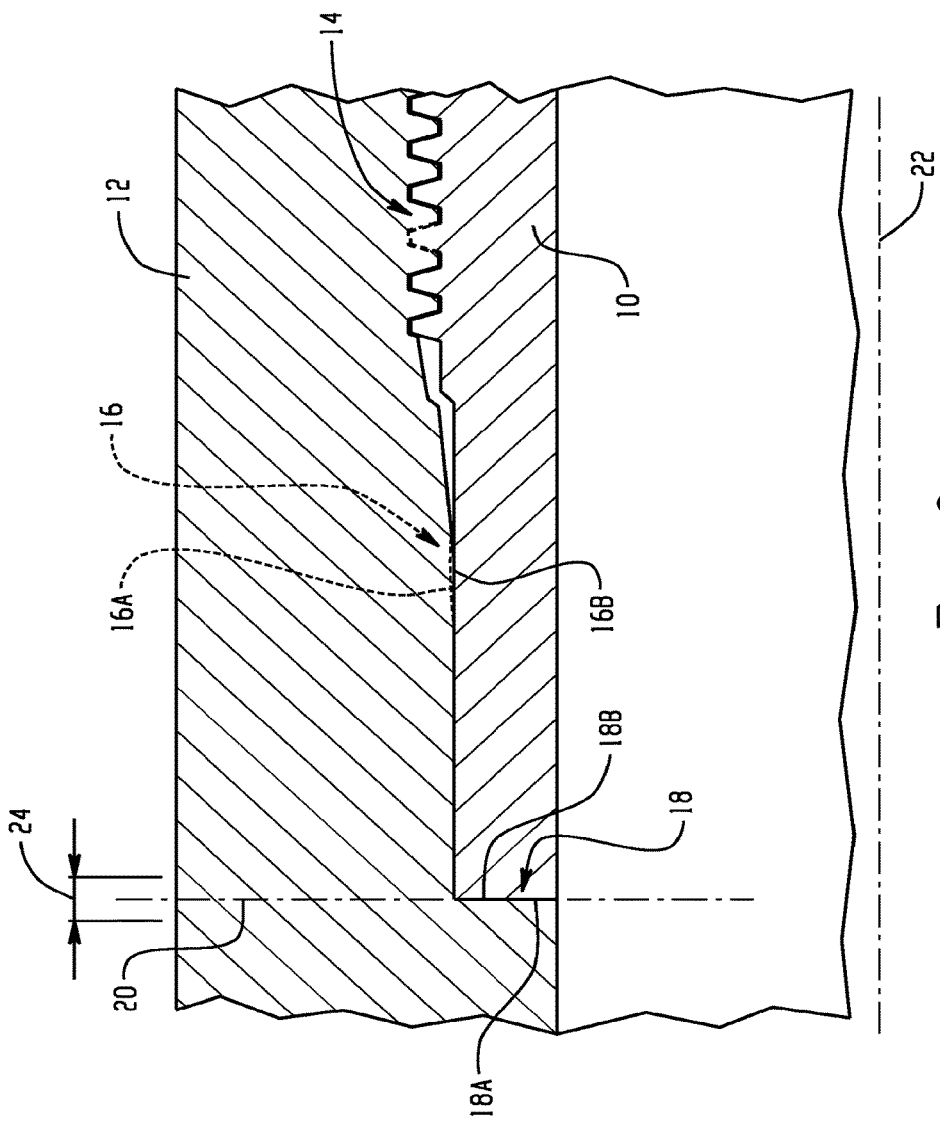
FIG. 3 shows an exemplary premium connection with a cylindrical torque shoulder surface.

As aforementioned, most "premium" connections, per the schematic partial pin 10 and box 12 connection shown in FIG. 3, include threads 14, a metal seal 16, and a positive torque shoulder 18. As the first member of the connection is assembled into the second, mating member, the threads contact at some point on their respective "stab" flanks. As the first member 10 is rotated into the second, driven by a moment external to the member, the threads engage, and the first member of the threaded connection moves into the second member, constrained by the geometry of the engaged threads. As the thread engagement nears complete assembly, two opposing structures, the "torque shoulders," contact.

The conventional torque shoulder normally found at the pin-nose to box-base interface of a threaded and coupled premium connection is a cylindrical shoulder surface as represented in FIG. 3, about the complete circumference of both members. Both shoulders are either located in respective planes (e.g., 20) substantially perpendicular to the longitudinal axis 22 of the member/connection (e.g., in the case of shoulder surfaces that extend radially only as shown) or along respective, relatively narrow axial extents (e.g., axial extent 24, in the case of shoulders that extend at some angle to the radial direction). In either case, at any given radial distance from the center axis of the member/connection, a circumferentially extending line can be defined along the surface for that radial distance and the line will lie in a plane substantially perpendicular to the axis of the connection. As the metal seal surface 16A of the first member contacts the metal seal surface 16B of the second member, the reaction between the two generates an opposing force and momentarily arrests the continued axial relative motion of the threaded members. The threads of the first member, driven by the external moment, continue to rotate, causing a shift such that the thread contact moves from stab-flank engagement to load-flank engagement.

Once the load flanks of the threads are engaged, any increasing additional externally applied moment causes a reaction between the load flanks of the thread and the metal to metal seal forcing the first member into the second along the path defined by the thread geometry, and further engaging the metal seals, overcoming the resistance of the seals interfering fit. Once the torque shoulder surface 18A of the first member contacts the torque shoulder surface 18B of the second member, further rotation is not possible. The contact between each members torque shoulders, resists further circumferential movement.

If the external moment is sufficiently large, and the bearing and shear capacity of the threads sufficiently large, the torque shoulder(s) themselves will yield, the force reacting between the shoulders of each member becoming greater than the shear or bearing capacity of the shoulder.

The present disclosure is directed to a solution to increase the torque resistance of a connection by increasing the surface area of the torque shoulder, as contact stress is directly proportional to force and inversely proportional to area. For a given pipe wall thickness, the threads must utilize a certain percentage of the radial depth of thickness of the wall section to generate the required bearing and shear area necessary for the threads to transmit the pipe load. The actual percentage of cross-sectional area is a function of thread geometry: thread pitch, thread height, and thread taper. The remaining portion of the radial depth or thickness of the wall section may be used for metal-to metal sealing surfaces and the torque shoulder.

Cold forming the pin nose to reduce the internal diameter of the pin member enables the designer to increase the torque shoulder surface area, but has limitations. One of the most important requirements of Oil Country Tubular Goods is the "drift diameter", the largest cylinder of a specified diameter and length that will pass through the assembled tubes and connections. Drift diameter is only slightly smaller than the nominal inside diameter of the pipe body. Hence the pin can only be formed a small amount, limiting the increase in shoulder surface area to a small amount.

Figure 4:
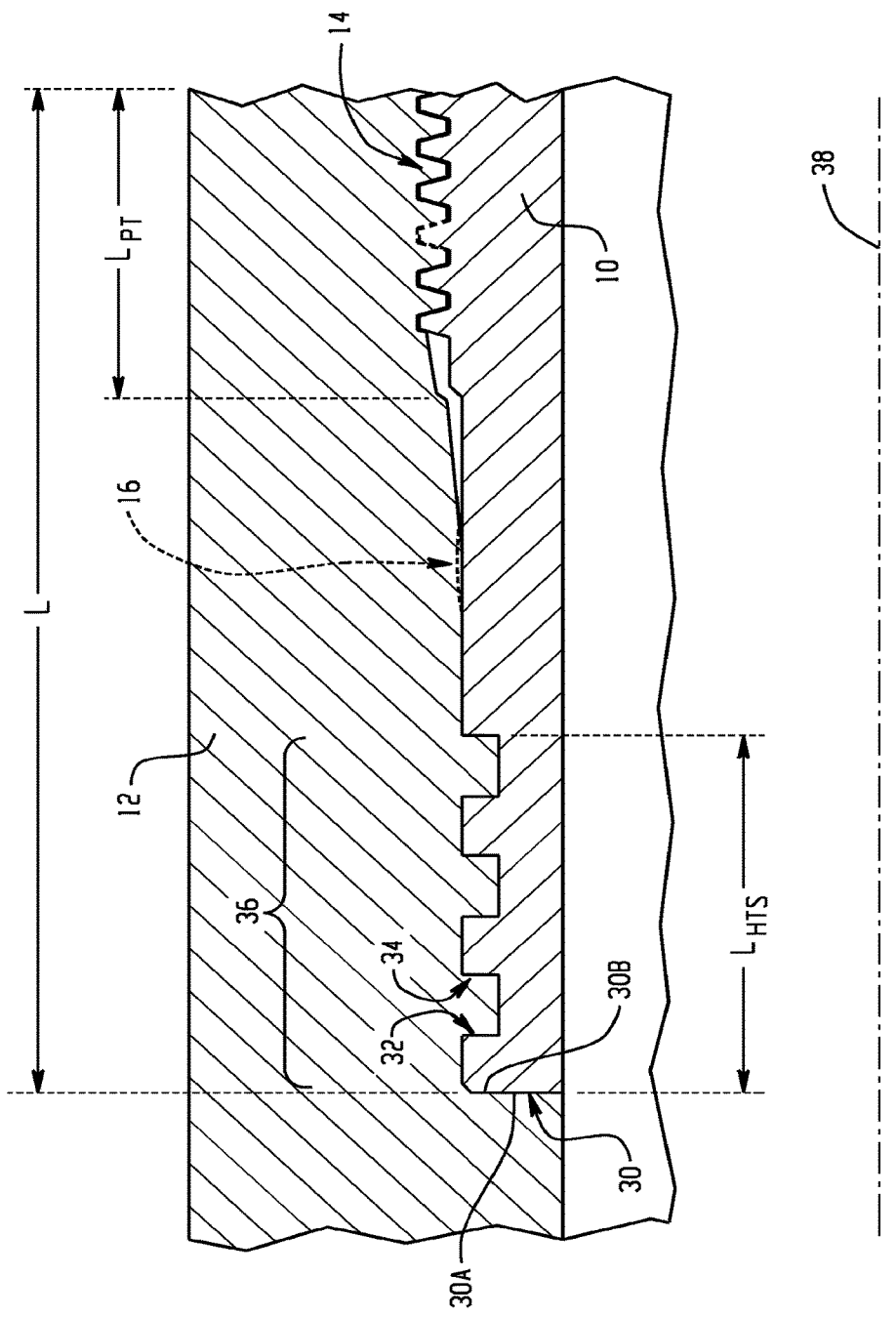
FIG. 4 shows an embodiment of a connection with a helical torque shoulder that runs into a cylindrical torque shoulder.
Figure 5:
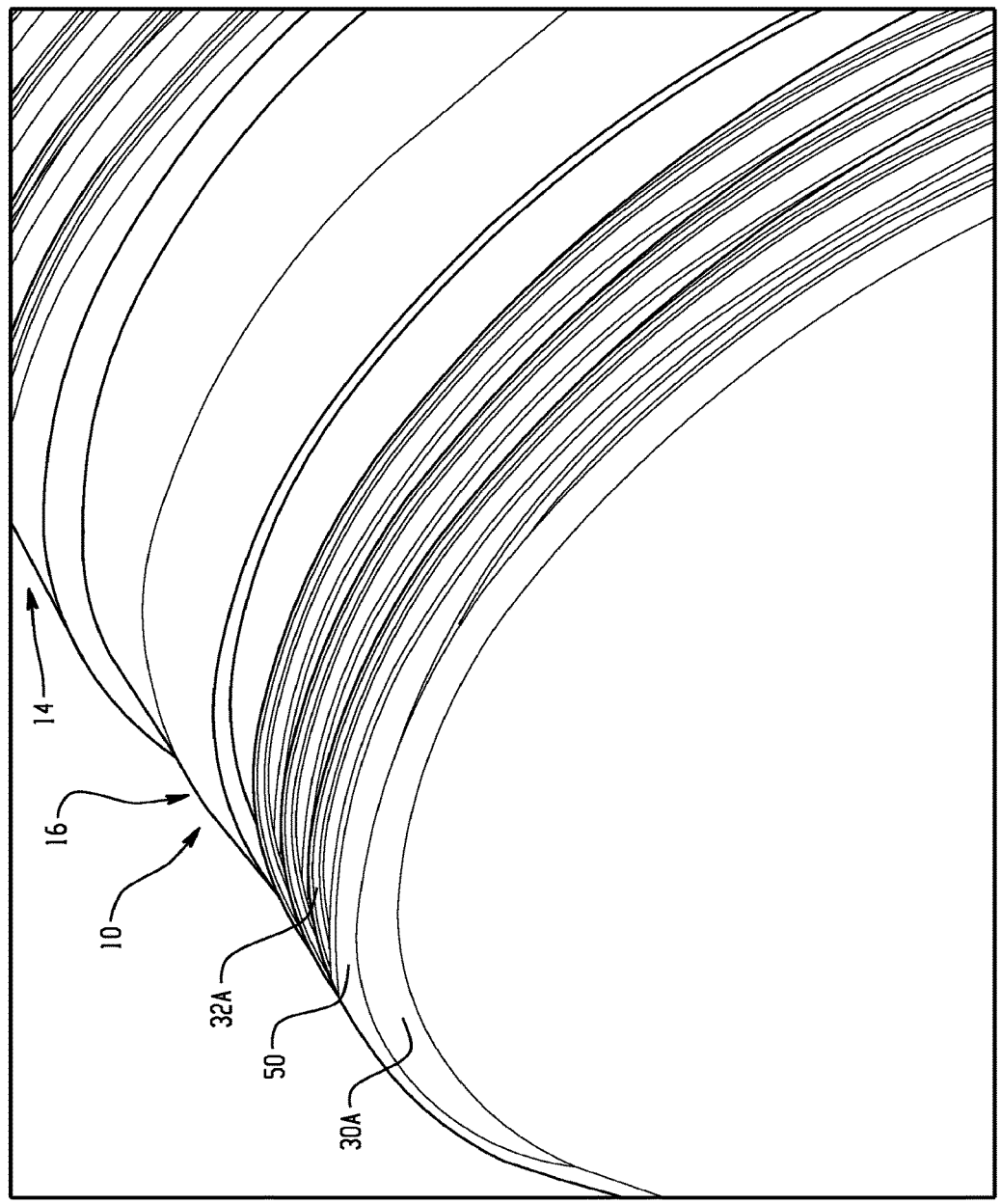
FIGS. 5 and 6 show another embodiment of a connection with a helical torque shoulder that runs into a cylindrical torque shoulder.
Figure 6:
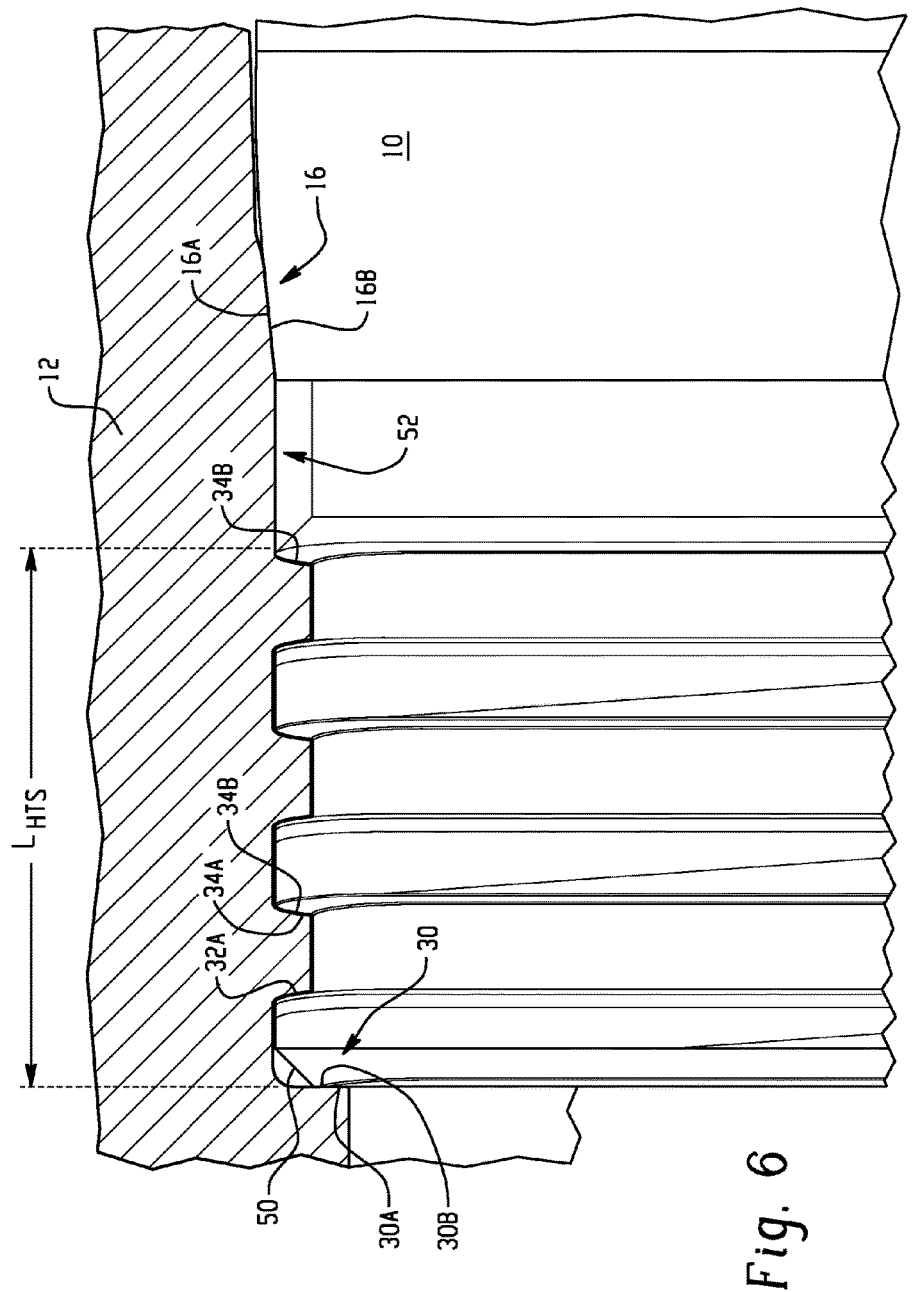

In the embodiments illustrated in FIGS. 4-6, the conventional torque shoulder 30 normally found at the pin-nose to box-base of a threaded and coupled premium connection is supplemented by a set of helical surfaces 32 and 34, machined on a cylindrical section 36 of the tube body parallel to its longitudinal axis 38. The pin member 10 helical torque shoulder has two flanks 32A, 34A, joined by a root and a crest about a helix of three turns. The box member 12 would have corresponding mating torque shoulder flanks. Each of these surfaces has the potential to add surface area to the cylindrical torque shoulder. While the extent of surfaces may vary from less than one turn to more than three turns, the primary issue is finding the surfaces that will support the reaction of the primary torque shoulder surfaces 30A and 30B, still cylindrical, against the load flank surfaces of the connection's threads.

In the embodiments illustrated, the helical torque shoulder is in the nature of a trapezoidal "Flank-to-Flank" design. As seen in FIG. 6, the helical torque shoulder may include start chamfers 50. The box member may also include a clearance zone 52 between the box metal seal surface 16B and the start of the box torque shoulder surface 34B to allow the pin nose and associated start of the pin helical torque shoulder to stab to a location just short (e.g., axially just to the right of in the view of FIG. 6) of the start of the box torque shoulder surface 34B. During assembly, both helically extending flanks/shoulder surfaces of the helical torque shoulder of one member contact the mating flanks/shoulder surfaces of the helical shoulder of the other member prior to complete assembly (e.g., as the helical torque shoulder on the pin 10 moves into the helical torque shoulder on the box 12).

The flank surfaces, machined on a mild angle measured from the perpendicular to the longitudinal axis of the pipe body, allow further rotation of the connection driven by the externally applied moment. As the flank surfaces are driven further together, the normal force between the flank surfaces increases, and the resulting increased force of friction resists the externally applied moment; i.e., it requires a greater moment, torque, to continue to drive the two members together.

As the members are fully assembled, the helical torques shoulder form ends and the two cylindrical torque shoulder surfaces engage, greatly increasing the assembly torque requirements. Furthermore, once the engaging member is arrested by the perpendicular, cylindrical shoulder, any increasing externally applied moment continues to force a larger and larger reaction between the load flanks of the helical torque shoulder surfaces and the cylindrical shoulder surfaces.

The reaction between the load flanks of the pin and the load flanks of the box results in a compressive force acting on the pin member as the load flanks of the box force the load flanks and the entire pin member into the box member. The reaction between the load flanks of the box and the load flanks of the pin results in a tension force acting on the box member as the load flanks of the pin force the load flanks and the entire box member away from the cylindrical torque shoulder.

As the forces increase driven by the increasing external moment, Poisson's effect drives both the pin and box members: diametrically increasing the circumference of the pin, which is in compression; diametrically decreasing the circumference of the box, which is in tension. This reaction initiates at the cylindrical shoulder surfaces and transfers back the connection, starting with the helical torque shoulder. Poison's effect locks the helical surfaces, starting immediately at the intersection of the cylindrical torque shoulder and working through the helical torque shoulders in the direction of the threads. This locking mechanism enables both flanks of the helical torque shoulder to increase the effective area of the combined torque shoulder.

This embodiment of the invention offers a number of advantages.

The helical torque shoulder requires only a few helically machined surfaces.

The surfaces are similar to thread form, albeit with different function, and can be machined in similar manner to threads.

The helical torque shoulder of the illustrated embodiment is machined on a cylindrical path, parallel to the pipe body longitudinal axis, further simplifying both machining and measuring the surfaces. However, in other embodiments the helical torque shoulder could be machined on a tapered path.

The engaged surface area may be enlarged by either changing the form (e.g., for thicker-walled tubes, the height of the surfaces may be increased, or the pitch varied).

Other embodiments of this invention may offer additional or complementary advantages. For example, the above description described trapezoidal formed surfaces with a mild angle to the perpendicular to the axis of the tube. Even a mild angle will generate some radial forces. These radial forces will tend to force the two members apart, with the most detrimental effect upon the member with the thinner cross-section; in the embodiment illustrated the pin. An alternate embodiment may use helical surfaces of square or rectangular shape, with the angle between flank surfaces and the perpendicular to the longitudinal pipe axis at or near zero.

Other embodiments may use a more complex form, with some flanks having negative angles, or dovetail angles. The illustrated helical torque shoulder follows a cylindrical profile relative to the axis of the connection, and therefore does not require an axial engagement clearance as make-up thread forms used in oilfield casing or tubing applications do. Threaded connections must have the characteristic of being able to be assembled on a drilling rig. This requires some "stabbing" depth to stabilize the length of pipe hanging in the derrick whilst the rig workers initialize contact between the two members and rotate them together. The primary threads 14 in this connection perform that function, whilst the helical torque shoulder need only be optimized to react to the externally applied moment, the "make-up" torque. Thus, in the contemplated connection the helical torque shoulder surfaces will not be engaged or axially overlapped when the two members are in the stab position defined by the primary threads that control the make-up operation. Only after relative rotation of one member causes axial movement of the members together will the helical shoulder surfaces begin to axially overlap and move into each other.

Figure 7:
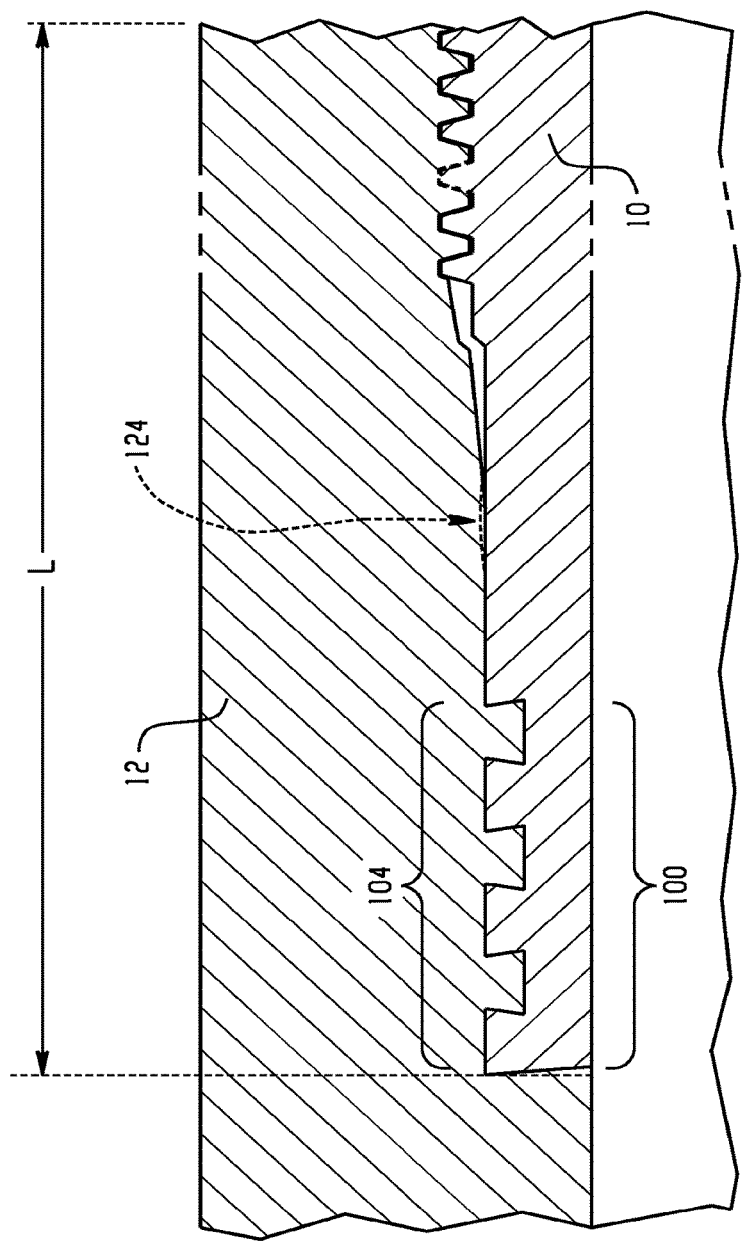
FIG. 7 shows a connection embodiment in which the helical torque shoulder is formed by a dovetail wedge structure.
Figure 8:
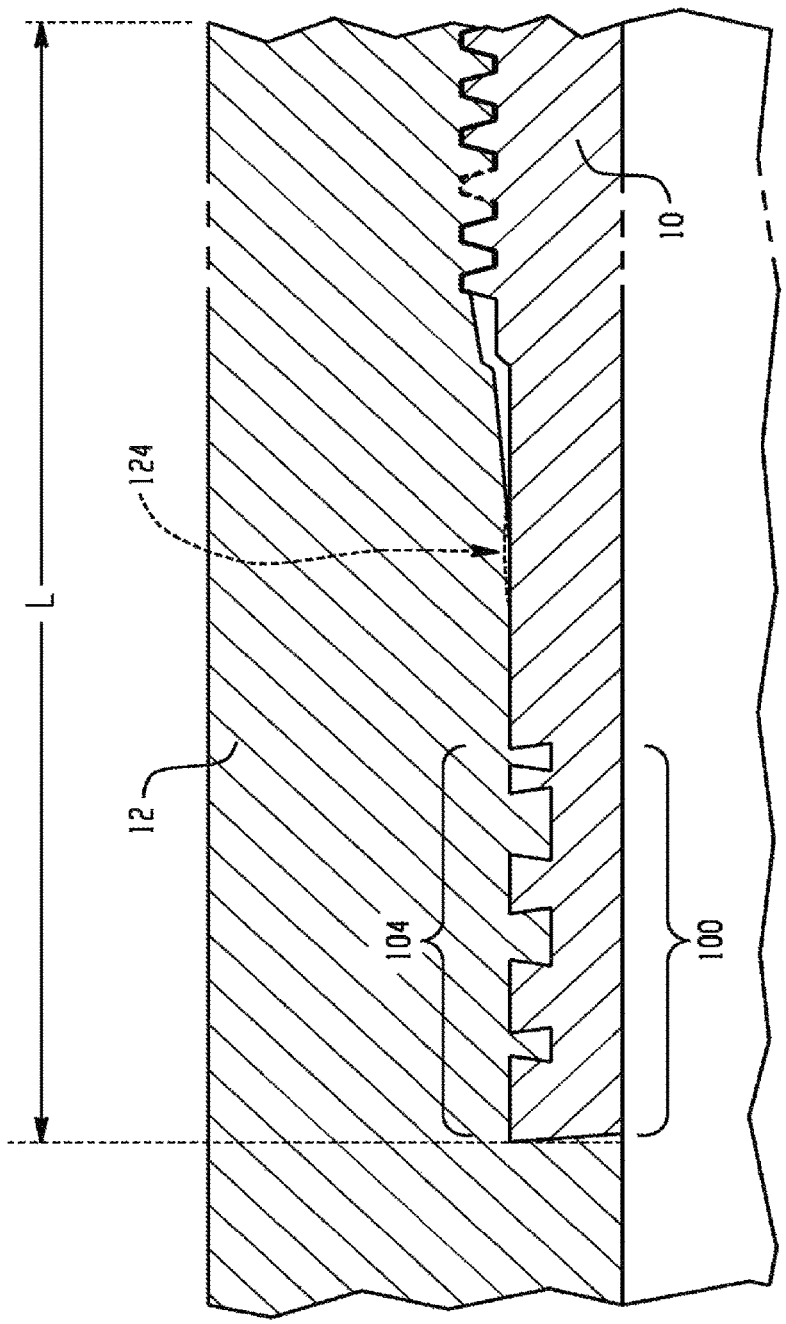
FIG. 8 shows an embodiment of FIG. 7 with a variable pitch helical torque shoulder.

Other embodiments may actually use a variable width form of square, near-square, or dovetail design, in which the flank contact may be enhanced by the wedging mechanisms of the aforementioned wedge thread. Increased torque capacity is a function of the increased surface contact area of both flanks of the tooth and groove pairs within the wedged torque shoulder. This value can be optimized based upon available section height and the assembly rotations of the principal driver threads (the conventional threads located elsewhere in the connection). By way of example, FIG. 7 shows an embodiment in which the helical shoulder takes on a trapezoidal form that wedges (e.g., as the helical torque shoulder 100 of the pin member moves into the helical torque shoulder 104 of the box member, the shoulders wedge upon full make-up; metal to metal seal is shown at 124).

Torque capacity is also enhanced by any conventional torque shoulder that may exist within the threaded connection, and should work in conjunction with the helical torque shoulder described above. A conventional torque shoulder may be an extension of the helical torque shoulder or be located independently of it, elsewhere within the connection.

Premium connections have shoulders in different locations, and in some cases, multiple shoulders. The primary locations are:

Pin-Nose/Box-Base, intersecting the inside diameter of the connection (the example given herein).

Pin-Base/Box-Face; i.e., intersecting the outside diameter of the connection.

The middle-wall section of the connection, the "center shoulder" (e.g., per shoulder location shown in U.S. Pat. No. 5,415,442, which is incorporated herein by reference).

One skilled in the art will recognize that the concept of a helical torque shoulder can be utilized in any and all of these shoulder configurations, with appropriate modifications.

Although a metal seal may or may not be present within the threaded connection, a configuration utilizing a metal-to-metal seal between the helical torque shoulder and conventional threads will have an additional advantage over a conventional premium connection in that the helical torque shoulder will isolate the metal-to-metal seal from the compressive loading experienced by the pin member.

Metal seals are formed by interferingly fitting two smooth metal surfaces together. During compressive loading, the metal seal, particularly of the pin member, may be deformed because of excessive compressive loading. Because of the contact pressure produced by the interference fit, the two surfaces try to separate. Although conventional designs use techniques to keep the two surfaces together, analysis shows some degree of separation and resultant loss of contact pressure. The helical torque shoulder will isolate the seal surfaces from the effect of axial loads and produce a more stable and consistent metal seal under a variety of loading conditions.

The helical torque shoulder structures described herein provide a torque shoulder surface that extends through more than 360 degrees and, preferably through more than 720 degrees. When following the helical shoulder surface at a given radial distance from the central longitudinal axis, the resulting track will not lie within a plane substantially perpendicular to the longitudinal axis of the pipe or connection body, or even a narrow extent as suggested in FIG. 3, due the helical nature of the surfaces.

In one implementation, an axial length $L_{HTS}$ of the helical torque shoulder may be 30% or less of the overall length L of the connection, while a length of $L_{PT}$ of the primary thread may be about 50% or more (e.g., 60% or more) of the overall length L of the connection, it being understood that the length L of the connection is defined as axial distance between (i) the shoulder, metal to metal seal or thread located furthest toward one end of the connection and (ii) the shoulder, metal to metal seal or thread located furthest toward an opposite end of the connection.

In one implementation, the axial length $L_{HTS}$ of the helical torque shoulder may be between about 15% and 45% of the axial length $L_{PT}$ of the primary thread.

In one implementation, the helical torque shoulder extends through no more than four turns, while the primary thread form extends through at least ten turns.

It is to be clearly understood that the above description is intended by way of illustration and example only, is not intended to be taken by way of limitation, and that other changes and modifications are possible. For example, while tapered constant pitch threads of the type used in premium connections (e.g., per the ULTRA-DQX, ULTRA-FJ, ULTRA-QX and ULTRA-SF connections available from Ultra Premium Oilfield Products of Houston, Tex.) are primarily described in conjunction with the helical torque shoulder threads, other types of thread structures could be used in place of the premium connection threads, such as API Round threads, API Buttress threads or others.

What is claimed is:

1. A tubular connection, comprising:
    a pin member having:
        a first tapered constant pitch thread having a root, a crest, a stab flank and a load flank;
        a first variable pitch helical torque shoulder surface spaced axially along the pin member from the first tapered constant pitch thread, the first variable pitch helical torque shoulder surface being non-tapered;
    a box member having:
        a second tapered constant pitch thread having a root, a crest, a stab flank and a load flank;
        a second variable pitch helical torque shoulder surface spaced axially along the box member from the second tapered constant pitch thread, the second variable pitch helical torque shoulder surface being non-tapered;
    the pin member and the box member configured such that in the stab position the first variable pitch helical torque shoulder surface does not engage or overlap with the second variable pitch helical torque shoulder surface.

2. The tubular connection of claim 1 wherein both (i) the first tapered constant pitch thread and the first variable pitch helical torque shoulder surface are sized and located relative to each other and (ii) the second tapered constant pitch thread and the second variable pitch helical torque shoulder surface are sized and located relative to each other, such that during rotational make-up of the pin member and box member under control of interaction between the first tapered constant pitch thread and the second tapered constant pitch thread, the first variable pitch helical torque shoulder surface is guided into cooperating alignment with the second variable pitch helical torque shoulder surface.

3. The tubular connection of claim 2 wherein upon final make-up of the pin member and the box member the first variable pitch helical torque shoulder surface is moved into wedged engagement with the second variable pitch helical torque shoulder surface.

4. The tubular connection of claim 2 wherein upon final make-up of the pin member and the box member, the first variable pitch helical torque shoulder surface and second variable pitch helical torque shoulder surface are engaged at a location that is one of (i) at a pin-nose/box-base location that intersects the inside diameter of the connection, (ii) at a pin-base/box-face location that intersects the outside diameter of the connection or (iii) at a middle-wall section of the connection as a center shoulder of the connection.

5. The tubular connection of claim 1 wherein the first variable pitch helical torque shoulder surface and second variable pitch helical torque shoulder surface have a load flank lead greater than the stab flank lead.

6. The tubular connection of claim 1, wherein:
    a root diameter of the first variable pitch helical torque shoulder surface is smaller than both a starting root diameter of the first tapered constant pitch thread and an ending root diameter of the first tapered constant pitch thread;
    a root diameter of the second variable pitch helical torque shoulder surface is smaller than both a starting root diameter of the second tapered constant pitch thread and an ending root diameter of the second tapered constant pitch thread.

7. The tubular connection of claim 6 wherein:
    the pin member includes a first transition zone axially between the first variable pitch helical torque shoulder surface and the first tapered constant pitch thread, the first transition zone including a first seal surface;
    the box member includes a second transition zone axially between the second variable pitch helical torque shoulder surface and the second tapered constant pitch thread, the second transition zone including a second seal surface;
    in full made up condition the first seal surface engages the second seal surface for sealing.

8. The tubular connection of claim 7 wherein:
    an axial length of the first variable pitch helical torque shoulder surface is less than an axial length of the first tapered constant pitch thread;
    an axial length of the second variable pitch helical torque shoulder surface is less than an axial length of the second tapered constant pitch thread.

9. The tubular connection of claim 8 wherein:
the axial length of the first variable pitch helical torque shoulder surface is substantially less than the axial length of the first tapered constant pitch thread;
the axial length of the second variable pitch helical torque shoulder surface is substantially less than the axial length of the second tapered constant pitch thread.

10. The tubular connection of claim 6 wherein:
the first variable pitch helical torque shoulder surface extends for substantially fewer turns than does the first tapered constant pitch thread;
the second variable pitch helical torque shoulder surface extends for substantially fewer turns than does the second tapered constant pitch thread.

11. The tubular connection of claim 1 wherein the first variable pitch helical torque shoulder surface extends substantially to a first substantially cylindrical torque shoulder surface of the pin member and the second variable pitch helical torque shoulder surface extends substantially to a second substantially cylindrical torque shoulder surface of the box member, in full made-up position of the connection the first substantially cylindrical torque shoulder surface engages the second substantially cylindrical torque shoulder surface and the first variable pitch helical torque shoulder surface engages the second variable pitch helical torque shoulder surface, such that a combined cylindrical and helical torque shoulder results.

12. A tubular connection, comprising:
a pin member having:
a first tapered constant pitch thread structure;
a first variable pitch helical torque shoulder surface spaced axially along the pin member from the first thread structure, wherein the first variable pitch helical torque shoulder is non-tapered;
a box member having:
a second tapered constant pitch thread structure;
a second variable pitch helical torque shoulder surface spaced axially along the box member from the second thread structure, wherein the second variable pitch helical torque shoulder is non-tapered;
wherein the first thread structure and the second thread structure are sized and located to control a stab position of the tubular connection, in the stab position the first variable pitch helical torque shoulder surface does not engage or overlap with the second variable pitch helical torque shoulder surface.

13. The tubular connection of claim 12 wherein the first variable pitch helical torque shoulder surface and second variable pitch helical torque shoulder surface have a load flank lead greater than the stab flank lead.

14. The tubular connection of claim 12 wherein:
both (i) the first thread structure and the first variable pitch helical torque shoulder surface are sized and located relative to each other and (ii) the second thread structure and the second variable pitch helical torque shoulder surface are sized and located relative to each other, such that during rotational make-up of the pin member and box member under control of interaction between the first thread structure and the second thread structure, the first variable pitch helical torque shoulder surface is guided into cooperating alignment with the second variable pitch helical torque shoulder surface.

15. The tubular connection of claim 12 wherein the first variable pitch helical torque shoulder surface extends substantially to a first substantially cylindrical torque shoulder of the pin member and the second variable pitch helical torque shoulder surface extends substantially to a second substantially cylindrical torque shoulder of the box member, in full made-up position of the connection the first substantially cylindrical torque shoulder engages the second substantially cylindrical torque shoulder and the first variable pitch helical torque shoulder surface engages the second variable pitch helical torque shoulder surface, such that a combined cylindrical and helical torque shoulder results.

16. A method of joining tubular length of oil country tubular casing or piping, the method comprising:
utilizing a first tubular member having an associated pin member with a first tapered constant pitch thread structure and a first non-tapered variable pitch helical torque shoulder surface spaced axially along the pin member from the first thread structure;
utilizing a second tubular member having an associated box member with a second tapered constant pitch thread structure and a second non-tapered variable pitch helical torque shoulder surface spaced axially along the box member from the second thread structure;
engaging the pin member and box member with each other into a stab position that is defined by interaction of the first thread structure and the second thread structure, in the stab position the first variable pitch helical torque shoulder surface does not engage or overlap with the second variable pitch helical torque shoulder surface;
rotating at least one of the first tubular member or the second tubular member such that interaction between the first thread structure and the second thread structure guides the first variable pitch helical torque shoulder surface into cooperating alignment with the second variable pitch helical torque shoulder surface.

17. The method of claim 16 including continuing rotation of at least one of the first tubular member or the second tubular member until the first variable pitch helical torque shoulder surface wedges with the second variable pitch helical torque shoulder surface.

18. The method of claim 17 wherein the pin member is formed integral with the first tubular member and the box member is formed integral with the second tubular member.

* * * * *